United States Patent
Bederna et al.

(10) Patent No.: US 7,001,553 B2
(45) Date of Patent: Feb. 21, 2006

(54) METHOD FOR FORMING AN AIR SPRING FLEXIBLE MEMBER

(75) Inventors: Christoph Bederna, Wunstorf/Steinhude (DE); Hubertus Gawinski, Lauenau (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 187 days.

(21) Appl. No.: 10/682,577

(22) Filed: Oct. 10, 2003

(65) Prior Publication Data

US 2004/0084135 A1    May 6, 2004

(30) Foreign Application Priority Data

Oct. 10, 2002   (DE) ................................ 102 47 337

(51) Int. Cl.
*B28B 7/32*       (2006.01)

(52) U.S. Cl. ........................ 264/159; 264/314; 425/390

(58) Field of Classification Search ................ 264/314, 264/159; 425/389, 390, 393; 156/156
See application file for complete search history.

(56) References Cited

U.S. PATENT DOCUMENTS

| | | | |
|---|---|---|---|
| 3,057,768 A | | 10/1962 | McGough |
| 3,651,180 A | * | 3/1972 | Glueckert .................... 264/51 |
| 4,017,572 A | * | 4/1977 | Magone et al. ............... 264/51 |

* cited by examiner

*Primary Examiner*—Blaine Copenheaver
*Assistant Examiner*—Barbara J Musser
(74) *Attorney, Agent, or Firm*—Walter Ottesen

(57) ABSTRACT

Tubular-shaped flexible members for air springs are made of rubber or rubber-like elastomers and are reinforced by reinforcement layers. In order that the air spring flexible member can roll telescopically off a roll-off piston, the tubular-shaped flexible member sections must be brought into a slightly conical or bottle-like configuration and then vulcanized in this form. A method forms and vulcanizes an air spring flexible member blank and utilizes an apparatus which includes a mold defining a bellied inner wall defining a common hollow space for receiving the air spring flexible member blank therein. A pressure bellows unit includes a pressure bellows extending axially in the common hollow space as well as first and second end pieces joined to the pressure bellows at corresponding longitudinal ends thereof. In the method, the blank is placed over the pressure bellows and pressurized air is introduced into the interior of the pressure bellows to expand the pressure bellows thereby pressing the blank against the bellied inner wall and causing the pressure bellows to shorten. The end pieces are moved along the longitudinal axis to follow the shortening of the pressure bellows as the pressure bellows expands thereby holding a mechanical loading on the pressure bellows to a low value.

6 Claims, 4 Drawing Sheets

METHOD FOR FORMING AN AIR SPRING FLEXIBLE MEMBER

FIELD OF THE INVENTION

Air spring flexible members such as are used in the air springs of motor vehicles comprise rubber or rubber-like elastomers and are reinforced with reinforcement layers. The manufacture takes place at first in the form of a tube-shaped unvulcanized blank. In order that an air spring flexible member can roll off telescopically on a roll-off piston, the flexible member section must first be brought into a slightly conical or bottle-shaped form and then be vulcanized in this form. The invention relates to a method for forming and vulcanizing the tube-shaped flexible member blank. The invention also relates to an apparatus for forming and vulcanizing the tube-shaped flexible member section.

BACKGROUND OF THE INVENTION

The method of forming an air spring as set forth in U.S. Pat. No. 3,057,768 is exemplary of the state of the art. The flexible member blank is first cylindrical and is then conically expanded at one of its ends. For this purpose, a pressure collar is introduced into the flexible member blank and a rigid form having conical or bottle-shaped spaces is applied and, after the two ends have been closed, the pressure collar is charged with hot vapor. The blank assumes the outer shape which is wanted because of the pressure and heat and is vulcanized, that is, the two ends have different diameters.

Whereas clamping the end of the flexible member blank which is not to be widened presents no difficulties, the clamping of the end which is to be expanded is not easily possible and requires special measures.

Also, the precision with respect to form of the end of the blank to be expanded could be better. In practice, it has been shown that the clamp ends are not usable for further use and must therefore be separated, that is, the blank must be cut at both ends to an extent which cannot be considered negligible.

SUMMARY OF THE INVENTION

It is an object of the invention to counter the above disadvantages and to provide an improved forming method for expanding and vulcanizing the flexible member blanks.

The method of the invention is for forming and vulcanizing an air spring flexible member blank having a predetermined length, the method utilizing an apparatus including: a mold defining a longitudinal axis and a bellied inner wall defining a common hollow space having a bellied expanse for receiving the air spring flexible member blank therein; a pressure bellows unit including a pressure bellows extending axially in the common hollow space; and, the pressure bellows unit including first and second end pieces joined to the pressure bellows at corresponding longitudinal ends thereof. The method includes the steps of: placing the blank over the pressure bellows with the blank having approximately the double length of a manufactured flexible member; introducing pressurized air into the interior of the pressure bellows to expand the pressure bellows thereby pressing the blank against the bellied inner wall and causing the pressure bellows to shorten along the longitudinal axis; and, causing the end pieces to move along the longitudinal axis to follow the shortening of the pressure bellows as the pressure bellows expands thereby holding a mechanical loading on the pressure bellows to a low value.

The basic advantage of the invention is that there is a reduction of the vulcanization errors and a preexpansion is made unnecessary which contributes to cost and deteriorates quality. The double flexible member principle of the invention also provides for a doubling of productivity. There is no cut in the center of the intermediate product (double flexible member) and the invention facilitates automatization.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
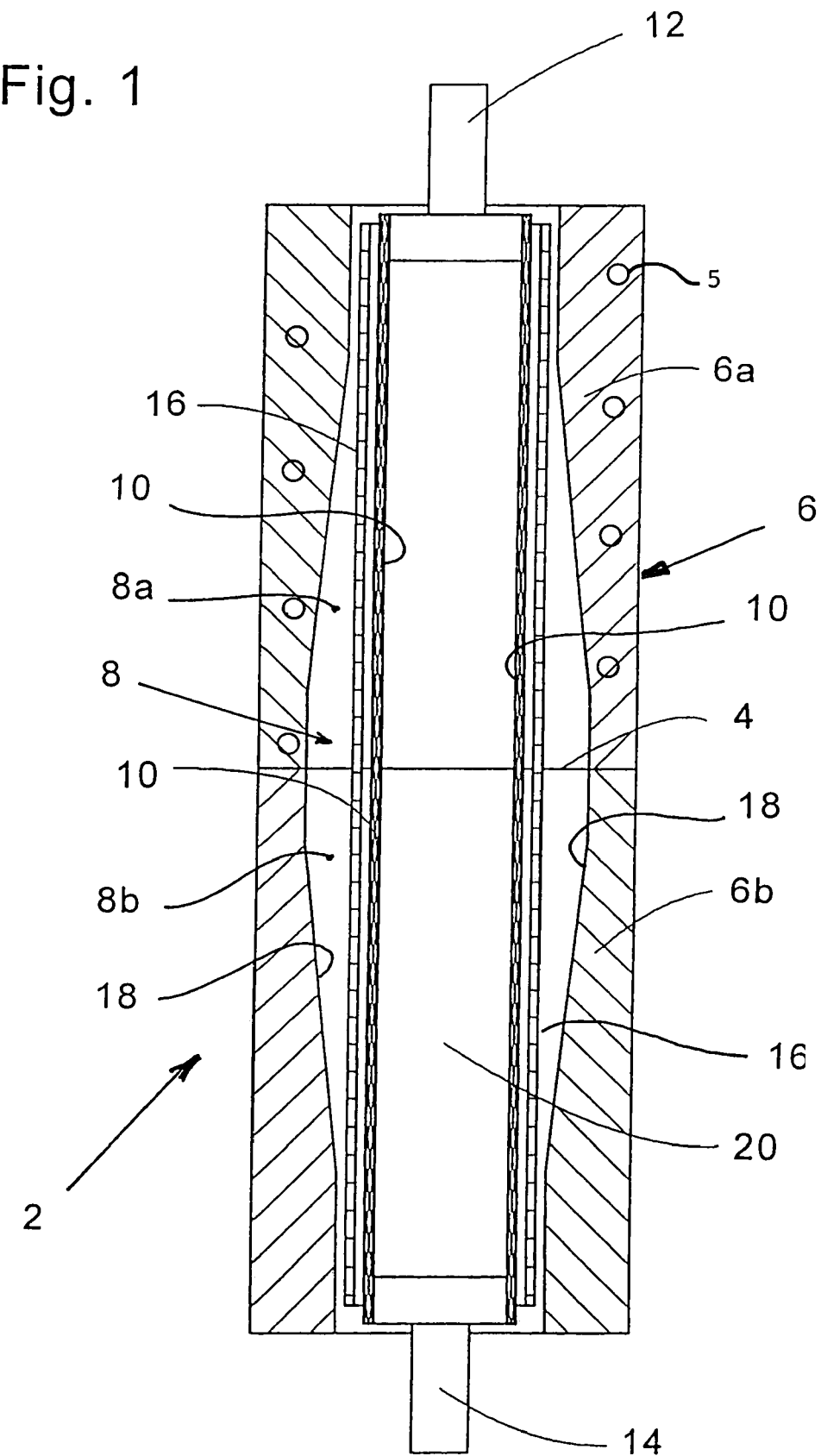
FIG. 1 is a first embodiment of the apparatus of the invention shown in longitudinal section.

The apparatus 2 shown in FIG. 1 includes a two-part external double mold 6 which is axially partitioned at the partition plane 4. The external double mold 6 comprises an upper mold 6a as well as a lower mold 6b. The two halves or molds (6a, 6b) are heated, preferably electrically, as indicated schematically by heating coil 5 in mold 6a. Mold 6b is also equipped with a corresponding heating coil. Each of the halves (6a, 6b) includes an approximately bottle-shaped hollow space (8a, 8b) which are mirror images of each other so that a bellied expanse results in the center of the common hollow space 8.

A pressure bellows 10 extends axially in the interior of the double mold 6 and is made of a heat-resistant elastomeric material which is preferably additive cross-linked silicone. The ends of the pressure bellows are secured at their respective ends, for example, by clamping at the upper and lower end pieces (12, 14). The upper end piece 12 and the lower end piece 14 are axially movable.

For the purpose of forming, a tube-shaped flexible member section 16 of approximately twice the length of the finished product is pushed over the pressure bellows 10.

With a pressure of greater than 6 bar, pressurized air is forced into the pressure space 20 of the pressure bellows 10. In this way, the pressure bellows 10, which is made of silicone, swells and presses the surrounding flexible member blank 16 against the inner wall 18 of the outer mold 6.

With the expansion operation, the air spring flexible member blank 16 shortens axially. The axial shortening is transferred to the pressure bellows 10 by friction and leads to an increased mechanical load on the pressure bellows 10 and especially at the two end pieces (12, 14). This problem is solved in accordance with the invention in that the axially movable end pieces (12, 14) of the pressure bellows 10 are caused to follow, during the expansion, the axial shortening of the pressure bellows associated with this expansion so that the mechanical load on the pressure bellows 10 becomes small.

The vulcanization of the blank takes place with the pressure bellows 10 pressing the blank from within the blank against the outer form 6 without preexpansion. During the vulcanization time, the outer form 6 is heated. After a heating duration of approximately 20 minutes, the vulcanization operation is completed and the pressure bellows 10 is vented to the ambient. In this way, the pressure bellows 10 drops back to its original diameter. After opening the outer form 6, the vulcanized double flexible member 16 can be removed. More specifically, two products, which hang together, are vulcanized in a single step. Thereafter, the mirror image-formed double flexible member 16 is separated midway whereby two flexible members of the same size are produced.

Figure 2:
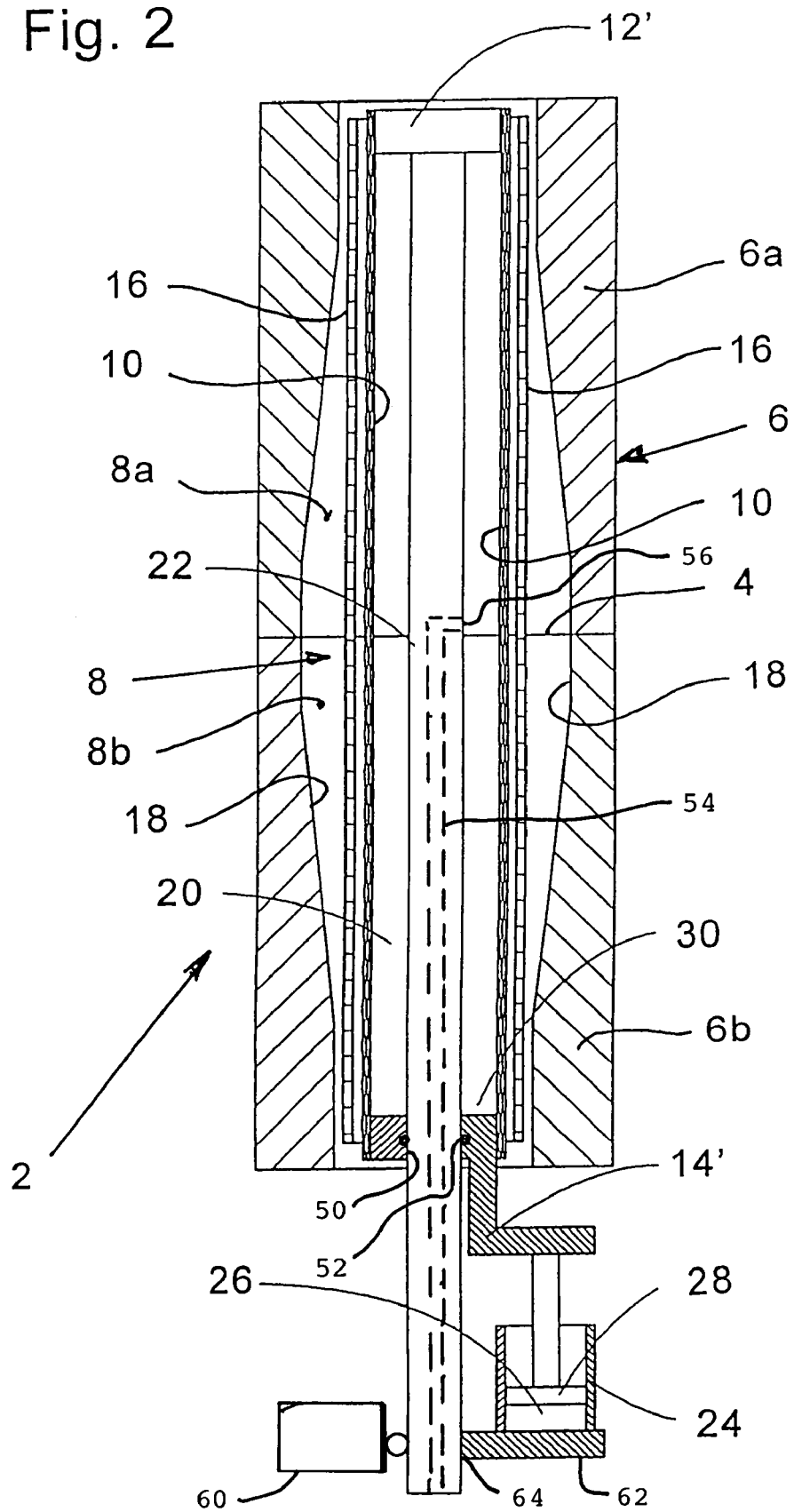
FIG. 2 is a second embodiment, in longitudinal section, of an embodiment of the apparatus of the invention.

In FIG. 2, the upper end piece 12' of the pressure bellows 10 is guided by a piston rod 22 which passes through a lower end piece 14'. Between the piston rod 22 and the lower end 14', there is a slide bearing 50 as well as O-ring seal 52. This arrangement affords the advantage that the blank 16 can be introduced and, after vulcanization, be removed from one end without disturbance. The supply of pressurized air to the pressure space 20 is achieved via a central bore 54 in the piston rod 22. The bore 54 communicates with the pressure space via apertures of which one aperture 56 is shown. In this way, pressurized air is introduced into the pressure space 20.

The lower end piece 14' as well as the piston rod 22 are coupled via a pneumatic cylinder 24. The pressure space 26 of the pneumatic cylinder 24 is connected to the pressure space 20 for pressure equalization. The surface 58 of the piston 28 and the annular surface 30 of the lower end piece 14' are of the same area size. In this way, it is ensured that the lower end piece 14' is guided for each vulcanization pressure axially without force relative to piston rod 22.

The axial stroke of the pneumatic cylinder 24 is recorded by a suitable measuring device. The axial position of the piston rod 22 is controlled via a suitable linear drive 60 so that the stroke of the piston rod 22 is always twice the stroke of the pneumatic cylinder 24. In this way, a forming is achieved which is symmetrical to the partition plane 4. The flange-like portion 62 of pneumatic cylinder 24 is fixedly attached to the piston rod 22 at 64.

The embodiment affords the advantage that the linear drive 60 must only transfer small forces to the piston rod 22.

Figure 3:
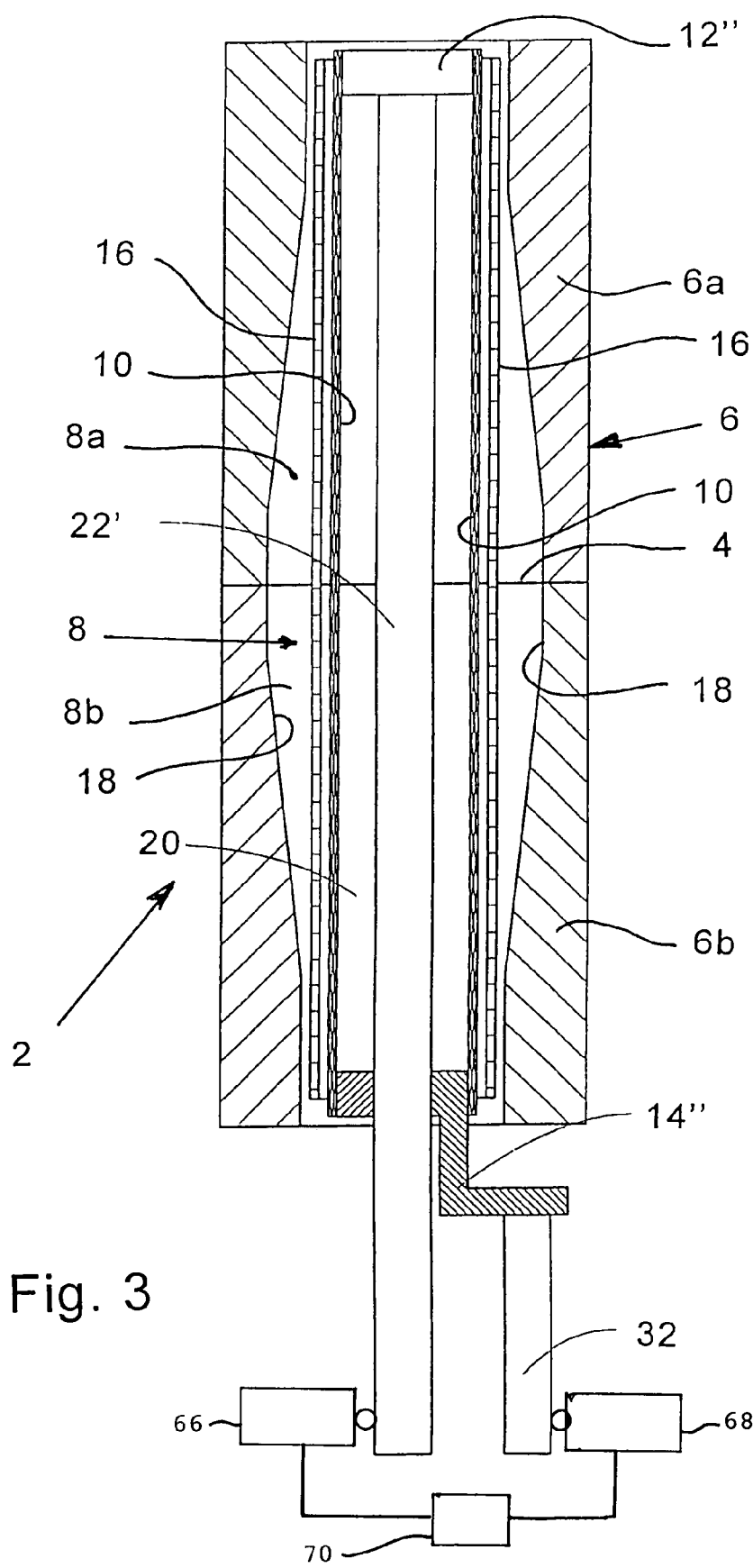
FIG. 3 is a schematic, in longitudinal section, of a third embodiment of the apparatus of the invention; and, FIG. 4 shows a plurality of apparatuses of the invention arranged to facilitate automation of the production of air spring flexible members.

FIG. 3 shows another embodiment of the vulcanizing apparatus of the invention. Here, the upper end piece 12" of the pressure bellows 10 is guided via a piston rod 22' through a lower end piece 14" and is connected to a suitable linear drive 66. The lower end piece 14" is likewise connected via an additional piston rod 32 to a linear drive 68. Both linear drives are driven as a function of the vulcanization pressure in opposite directions via a control 70 so that the mechanical load between the pressure bellows 10 and the end pieces (12", 14") is small. Here too, molding symmetrical to the partition plane 4 is achieved.

Figure 4:
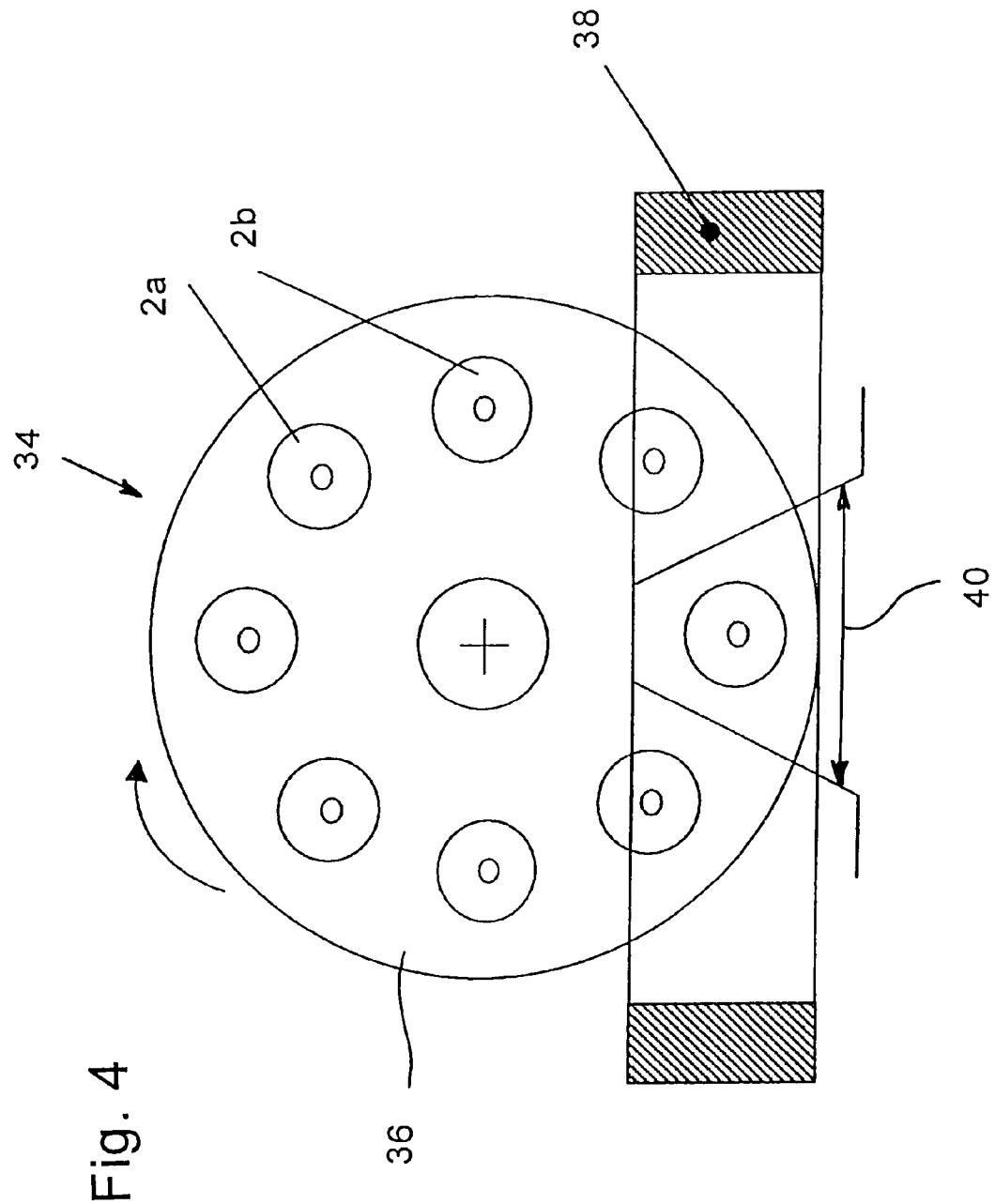

In order to reduce the cycle duration of approximately 20 minutes very substantially, FIG. 4 shows a further embodiment of the invention which includes a turret 34. Eight complete vulcanization apparatuses (2a, 2b, . . . ) are rotatably mounted in the manner of a turret on a drum 36. A spatially-fixed manipulating device 38 includes a work area 40 and makes possible the loading of the blanks and the removal of the vulcanized products.

It is understood that the foregoing description is that of the preferred embodiments of the invention and that various changes and modifications may be made thereto without departing from the spirit and scope of the invention as defined in the appended claims.

What is claimed is:

1. A method for forming and vulcanizing an air spring flexible member blank having a predetermined length, the method utilizing an apparatus including: a mold defining a longitudinal axis and a bellied inner wall defining a common hollow space having a bellied expanse for receiving the air spring flexible member blank therein; a pressure bellows unit including a pressure bellows extending axially in said common hollow space; and, said pressure bellows unit including first and second end pieces joined to said pressure bellows at corresponding longitudinal ends thereof; the method comprising the steps of:

placing said blank over said pressure bellows with said blank having approximately the double length of a manufactured flexible member;

introducing pressurized air into the interior of said pressure bellows to expand said pressure bellows thereby pressing said blank against said bellied inner wall and causing said pressure bellows to shorten along said longitudinal axis; and, causing said end pieces to move along said longitudinal axis to follow the shortening of said pressure bellows as said pressure bellows expands thereby holding a mechanical loading on said pressure bellows to a low value.

2. The method of claim 1, wherein said first end piece is guided by a piston rod passing through said second end piece and said piston rod is connected to a first linear drive unit; said second end piece is connected to a second linear drive unit; and, said first and second linear drive units are connected to a control unit which drives said drive units so that said end pieces move toward each other as a function of the pressure imparted by said pressurized air so that the mechanical load between said pressure bellows and said end pieces remains small.

3. The method of claim 1, wherein it is unnecessary to apply pressure to said pressure bellows in advance; and, the method comprising the further step of heating said mold to vulcanize said blank.

4. The method of claim 1, wherein said blank, after vulcanization, is removed from said mold after the latter is opened.

5. The method of claim 1, wherein said blank is separated at the middle thereby providing two flexible members of equal size.

6. The method of claim 2, wherein said interior of said pressure bellows is supplied via a central bore in the piston rod connected to said first end piece.

\* \* \* \* \*